(12) United States Patent
Matsumoto

(10) Patent No.: US 11,051,465 B2
(45) Date of Patent: Jul. 6, 2021

(54) FORESTRY HARVESTER

(71) Applicant: Ryozo Matsumoto, Fukuoka (JP)

(72) Inventor: Ryozo Matsumoto, Fukuoka (JP)

(*) Notice: Subject to any disclaimer, the term of this patent is extended or adjusted under 35 U.S.C. 154(b) by 83 days.

(21) Appl. No.: 16/318,003

(22) PCT Filed: Jun. 23, 2017

(86) PCT No.: PCT/JP2017/023223
§ 371 (c)(1),
(2) Date: Jan. 15, 2019

(87) PCT Pub. No.: WO2018/012255
PCT Pub. Date: Jan. 18, 2018

(65) Prior Publication Data
US 2019/0261582 A1    Aug. 29, 2019

(30) Foreign Application Priority Data

Jul. 15, 2016 (JP) .............................. JP2016-140081

(51) Int. Cl.
*A01G 23/095* (2006.01)
(52) U.S. Cl.
CPC .................................. *A01G 23/095* (2013.01)
(58) Field of Classification Search
CPC .... A01G 23/08; A01G 23/083; A01G 23/085; A01G 23/091; A01G 23/093; A01G 23/095
See application file for complete search history.

(56) References Cited

U.S. PATENT DOCUMENTS

| 4,050,485 A | | 9/1977 | Valo |
| 4,981,163 A | * | 1/1991 | Westlund ............. A01G 23/083 144/24.13 |

(Continued)

FOREIGN PATENT DOCUMENTS

| CN | 101573026 A | 11/2009 |
| CN | 104351012 A | 2/2015 |
| JP | 2015149897 A | 8/2015 |
| JP | 5914958 B2 | 5/2016 |

(Continued)

OTHER PUBLICATIONS

Int'l. Search Report issued in Int'l. App. No. PCT/JP2017/023223, dated Sep. 26, 2017.

(Continued)

*Primary Examiner* — Matthew Katcoff
(74) *Attorney, Agent, or Firm* — IpHorgan Ltd.

(57) ABSTRACT

A forestry harvester for delimbing a tree with an angular upper cutter and side cutters while advancing the tree by feed rollers, wherein when the feeding of the tree is stopped due to being incapable of cutting the limbs off, the angle-shaped upper cutter and the side cutters are moved relative to the tree with rotation of the feed rollers stopped to cut off the limbs of the tree therewith.
The forestry harvester comprises a feed unit (1 or 100) including a pair of left-hand and right-hand clamp arms (8, 9 or 108, 109) and feed means (20 or 120), a chain saw box (22a) having a power chain saw (22), a delimbing unit (2) including an angle-shaped upper cutter (52) and a pair of cutter arms (26, 26) each having a side cutter (25), guide mechanism for guiding the delimbing unit for forward and rearward movement of the delimbing unit relative to the feed unit, and a hydraulic cylinder (47) actuated to move the delimbing unit (2) toward and away from the feed unit (1 or 100).

15 Claims, 18 Drawing Sheets

(56) References Cited

U.S. PATENT DOCUMENTS

| | | | |
|---|---|---|---|
| 5,086,819 A | 2/1992 | Selby | |
| 5,785,101 A | 7/1998 | Wildey | |
| 5,865,229 A * | 2/1999 | Unosen | A01G 23/095 144/4.1 |
| 5,957,177 A * | 9/1999 | Smith | B27B 25/02 144/208.1 |
| 5,975,168 A | 11/1999 | Ericksson | |
| 7,938,154 B2 * | 5/2011 | Quirke | B27B 25/02 144/34.1 |
| 8,499,803 B2 * | 8/2013 | Smythe | A01G 23/095 144/24.13 |
| 9,403,474 B2 * | 8/2016 | Kaatrasalo | A01B 76/00 |
| 2010/0230008 A1 * | 9/2010 | Kondo | A01G 23/083 144/338 |
| 2010/0314000 A1 | 12/2010 | Smythe et al. | |
| 2014/0096869 A1 * | 4/2014 | Raunisto | B27L 7/00 144/4.6 |
| 2015/0144225 A1 * | 5/2015 | Stulen | B27L 1/12 144/208.91 |
| 2019/0159410 A1 * | 5/2019 | Kerik | A01G 23/083 |

FOREIGN PATENT DOCUMENTS

| | | |
|---|---|---|
| WO | WO2010004095 A1 | 1/2010 |
| WO | 2010143076 A2 | 12/2010 |

OTHER PUBLICATIONS

European Patent Office, Extended European Search Report, including the supplementary European search report and the European search opinion, dated Jan. 21, 2020, European patent application No. 17827385.

Chinese Intellectual Property Office; Patent Office Action; Matsumoto Ryozo Chinese Patent Application No. 201780043916.7 for Harvester for Forestry; dated Sep. 9, 2020; China.

* cited by examiner

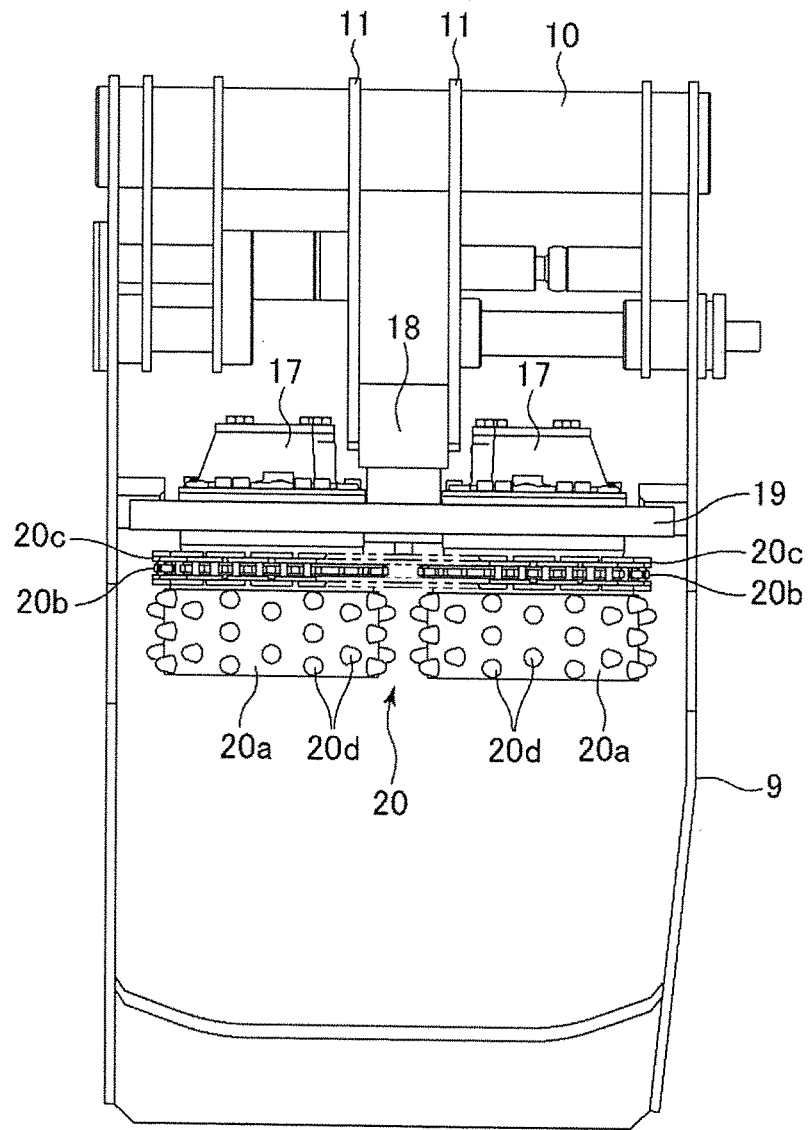
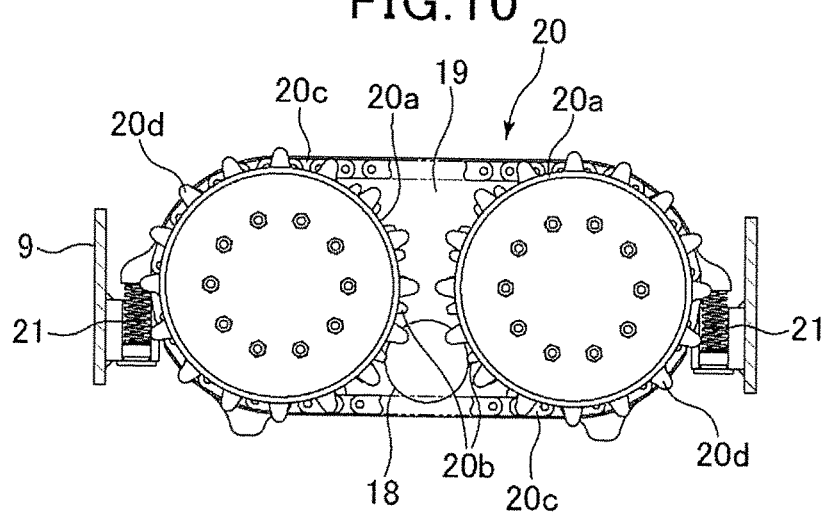

FORESTRY HARVESTER

TECHNICAL FIELD

This invention relates to a forestry harvester used to cut a standing tree or timber at a part near the roots thereof, thereby felling it, and cut the felled tree into logs of a predetermined length while delimbing the tree, or to cut a sideways felled tree picked up into logs of such a length.

BACKGROUND OF THE INVENTION

This type of harvester is disclosed in INTERNATIONAL PUBLICATION 2010/143076A2 (prior art document 1), Japanese Patent NO. 5914958 (prior art document 2), and like. The harvesters disclosed in those prior art documents, basically include an upper cutter fixed to a body supported from a boom of a carrier in a hanging state, a pair of cutter arms mounted to the body and operated to open and close, and having side cutters, feed rollers or wheels driven rotatively by respective reversible hydraulic motors, and a power chain saw adapted to swing for cutting operation. Prior to cutting a standing tree or timber, the entire harvester is vertically oriented. The standing tree is embraced and held by the cutter arms and the feed rollers, and then the chain saw is actuated to cut the tree at a part near the roots thereof. The boom is manipulated to fell the cut tree along with the harvester, and actuation of the hydraulic motors then causes the feed rollers to be normally rotated, thereby advancing the tree a predetermined length. In this process, if there are limbs on the tree, the tree is delimbed with the fixed upper cutter and side cutters.

With some kinds of hard or tough trees, there may be the occasion where the limbs cannot be cut off. The actuation of the hydraulic motors is stopped, and for that reason the feeding of the tree by the feed rollers stops. The actuation of the hydraulic motors subsequently causes the feed rollers to be reversely rotated, thereby retracting the tree, and again, the feed rollers are normally rotated to advance the tree so that the limbs are pushed against the upper cutter and the side cutters to delimb the tree therewith. In the case where nevertheless the delimbing is not successfully done, the same operation will be repeated, and at the time of the repeated operation the normal and reverse rotation of the feed rollers causes damage to the surface of the tree and it can take the delimbing much time depending on the kind of tree.

PRIOR ART DOCUMENTS

Patent Documents

Patent Document 1: International Publication 2010/143076A2

Patent Document 2: Japanese Patent NO. 5914958

SUMMARY OF THE INVENTION

Problem to be Resolved by the Invention

An object of the invention is to provide a forestry harvester for delimbing a tree with an angle-shaped upper cutter and side cutters while advancing the tree by feed rollers, wherein when the feeding of the tree stops due to being incapable of cutting the limbs off, the angle-shaped upper cutter and the side cutters are moved relative to the tree to cut off the limbs of the tree therewith.

This object can be achieved by providing a forestry harvester comprising a feed unit including a feed unit body, a pair of left-hand and right-hand clamp arms pivotally connected to the feed unit body and positioned in an offset relation relative to each other such that they are capable of intersecting, hydraulic cylinders actuated to open and close the clamp arms relative to each other, feed means mounted on each of the clamp arms and rotatively driven by reversible hydraulic motors to advance the tree, and a chain saw box mounted on the feed unit body and including a power chain saw, a delimbing unit including a delimbing unit body, an angular upper cutter fixedly secured to the delimbing unit body and a pair of cutter arms pivotally connected to the delimbing unit body as front and middle ones and each having a side cutter, hydraulic cylinders actuated to open and close the cutter arms relative to each other; guide mechanism for guiding the delimbing unit for its forward and reverse movement relative to the feed unit; and a hydraulic cylinder actuated to move the delimbing unit toward and away from the feed unit.

According to a preferred embodiment of the invention, the delimbing unit includes a rear cutter arm having a lower cutter and a hydraulic cylinder actuated to open and close the rear cutter arm.

According to a further preferred embodiment of the invention, the feed means each comprises a single roller or plurality of rollers having spikes on the periphery thereof to prevent the roller or rollers from slipping from the surface of the tree.

According to a further preferred embodiment of the invention, the feed means each comprises a pair of feed rollers, the clamp arms each includes a connecting pipe fixedly secured to the upper ends of the clamp arm and extending longitudinally similarly to the guide pipe of the feed unit body, a pair of central brackets are fixed to the connecting pipe, the reversible hydraulic motor means comprises a pair of hydraulic motors installed on a mounting plate swingingly mounted on a fixed shaft secured between the central brackets, each of the feed rollers is fixedly secured to a spindle of the hydraulic motor, and there are provided buffer springs between the mounting plate and the clamp arm.

According to a further preferred embodiment of the invention, the feed unit body includes a pair of left-hand and right-hand longitudinally extending guide pipes, the delimbing unit includes a pair of left-hand and right-hand longitudinally extending connecting pipes, and the guide mechanism comprises the guide pipes on the feed unit body and a slide shaft extending rearwardly from the connecting pipes on the delimbing unit and inserted into the guide pipes.

According to a further preferred embodiment of the invention, the feed unit includes a number of horizontally juxtaposed small diameter rollers mounted on a support frame fixedly secured to the feed unit body on a longitudinal center line of the feed unit and a large diameter roller mounted on the feed unit body in its forward position.

According to a further preferred embodiment of the invention, the delimbing unit includes a pair of rollers disposed in an angular form as viewed from the front, behind the angle-shaped upper cutter, and mounted rotatively on the delimbing unit body, and a plurality of horizontally juxtaposed rollers mounted on a support frame fixedly secured to the delimbing unit body on its longitudinal center line.

A further object of the invention can be achieved by providing a forestry harvester comprising a feed unit including a feed unit body, a pair of left-hand and right-hand clamp arms pivotally connected to the feed unit body in longitudinally offset positions where they are capable of intersecting, hydraulic cylinders actuated to open and close the clamp arms relative to each other, a pair of left-hand and right-hand feed means pivotally connected to the feed unit body and rotatively driven by reversible hydraulic motors to advance the tree, and a chain saw box mounted on the feed unit body and including a power chain saw, a delimbing unit including a delimbing unit body, an angle-shaped upper cutter fixedly secured to the delimbing unit body and a pair of cutter arms pivotally connected to the delimbing unit body in longitudinally offset positions as front and middle ones and each having a side cutter, hydraulic cylinders actuated to open and close the cutter arms relative to each other; guide mechanism for guiding the delimbing unit for forward and rearward movement of the delimbing unit relative to the feed unit; and a hydraulic cylinder actuated to move the delimbing unit toward and away from the feed unit.

According to a preferred embodiment of the invention, the delimbing unit further includes a rear cutter arm having a lower cutter and a hydraulic cylinder actuated to open and close the cutter arm.

According to a further preferred embodiment of the invention, the feed means comprises a left-hand single feed roller and a right-hand single feed roller each having spikes on the periphery thereof to prevent the roller from slipping from the surface of the tree.

According to a further preferred embodiment of the invention, the reversible hydraulic motor means each comprises a hydraulic motor installed on a support plate secured to brackets rotatively supported from the feed unit body, and each of the left-hand and right-hand rollers is fixedly secured to a spindle of the hydraulic motor.

According to a further preferred embodiment of the invention, the feed unit body includes a pair of left-hand and right-hand longitudinally extending guide pipes, the delimbing unit includes a pair of left-hand and right-hand longitudinally extending connecting pipes, and the guide mechanism comprises the guide pipes on the feed unit body and a slide shaft extending rearwardly from the connecting pipes on the delimbing unit and inserted into the guide pipes on the feed unit body.

According to a further preferred embodiment of the invention, the feed unit includes a hourglass-shaped roller rotatively driven by a pair of left-hand and right-hand hydraulic motors to assist the rollers in feeding the tree.

According to a further preferred embodiment of the invention, the delimbing unit includes a pair of rollers disposed in an angular form as viewed from the front, behind the angle-shaped upper cutter, and rotatively mounted on the delimbing unit body, and a plurality of horizontally juxtaposed rollers mounted on a support frame fixedly secured to the delimbing unit body on its longitudinal center.

Technical Effect of the Invention

In the normal state, the delimbing unit is retracted by the action of retraction of the hydraulic cylinder to be positioned adjacent the feed unit body. A boom or arm is then manipulated such that the entire harvester is vertically oriented, the hydraulic cylinder is actuated to close the cutter arms and the hydraulic cylinders are actuated to close the clamp arms and the feed means or the separate hydraulic cylinders are actuated to close the clamp arms and feed rollers, respectively, so that the standing tree or timber is secured by them. The timber is cut at a part near the roots thereof by the chain saw. The boom or arm is again manipulated to fell the timber along with the harvester, and the actuation of the hydraulic motors causes the feed means to rotate thereby advancing the timber a predetermined length. In that process, the limbs of the timber are pushed against the fixed upper cutter and the cutters of the front and middle cutter arms and rear cutter arms to delimb the timber with them. In the case where the cutters are incapable of cutting the limbs off, the actuation of the hydraulic motors stops due to an overload imposed thereon so that the timber cannot be fed by the feed means. The hydraulic cylinder is extended to cause the delimbing unit from the feed unit (in a direction where the delimbing unit is moved away from the feed unit), thereby cutting off the limbs with the cutters of the advancing delimbing unit. At the time, when by the retraction of the hydraulic cylinder the delimbing unit has been retracted to its original position, the feed means are rotated by the hydraulic motors to feed forward the timber a predetermined length and the chain saw is then actuated to cut the timber into a log. According to the invention, the surface of the timber is not damaged since the feed means are stopped while the delimbing takes place.

BRIEF DESCRIPTION OF THE DRAWINGS

FIG. 9 a side view of the clamp arms;

FIG. 10 a view showing the relationship between the clamp arm and feed rollers;

EMBODIMENTS OF THE INVENTION

Preferred embodiments of the present invention will be described below with reference to the accompanied drawings.

Figure 1:
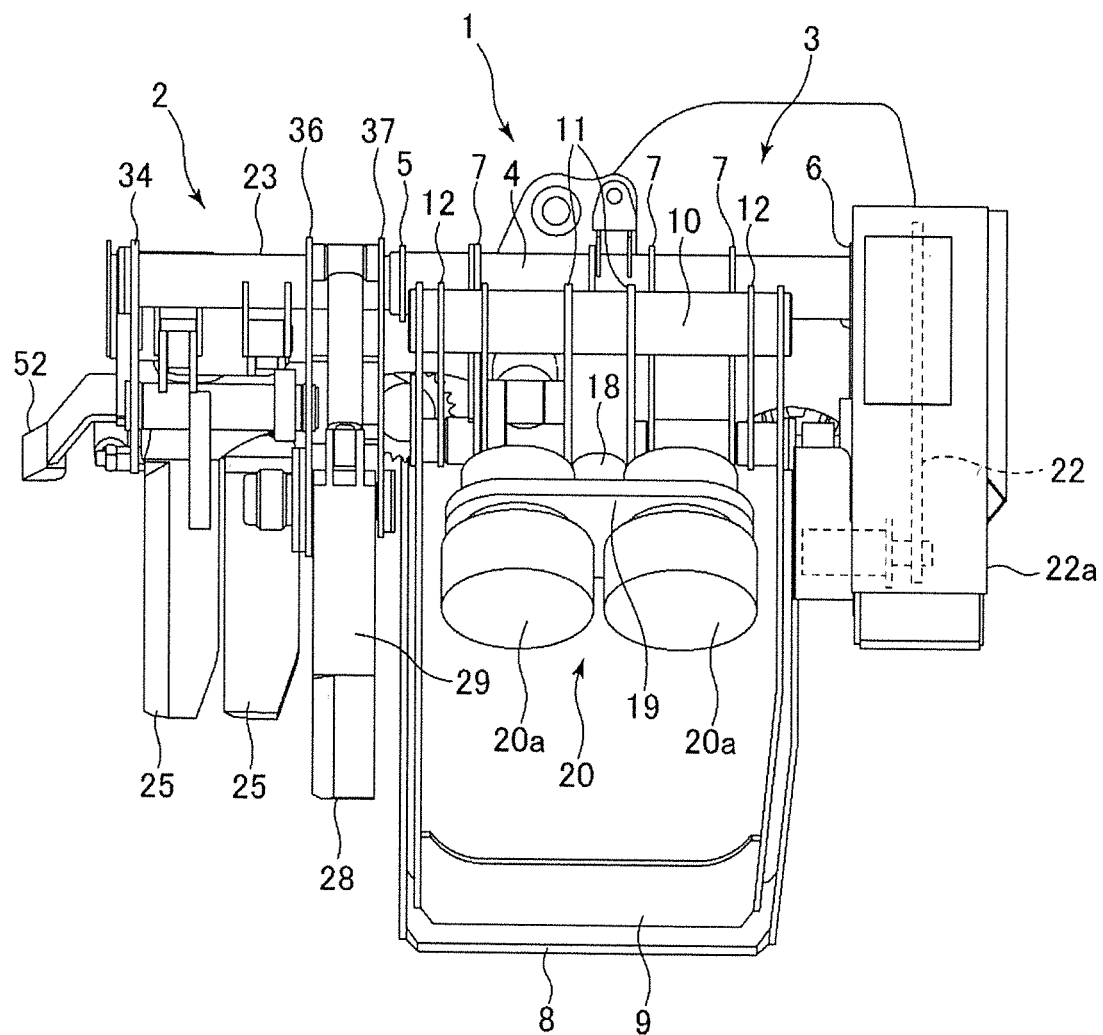
FIG. 1 a side view of an entire forestry harvester according to the invention, a delimbing unit being shown in a position retracted toward a feed unit.
Figure 2:
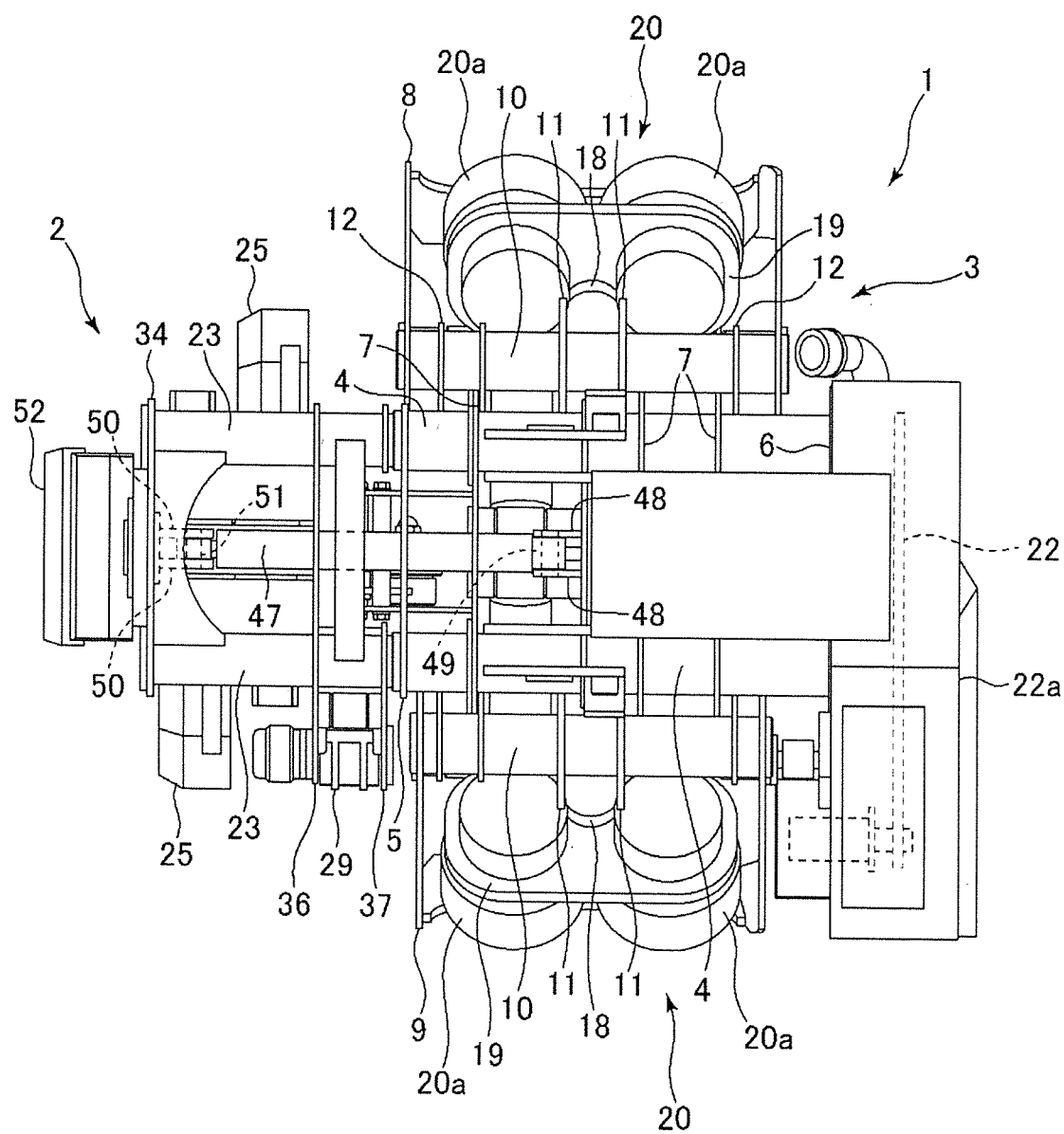
FIG. 2 a top plan view of the harvester shown in FIG. 1.
Figure 3:
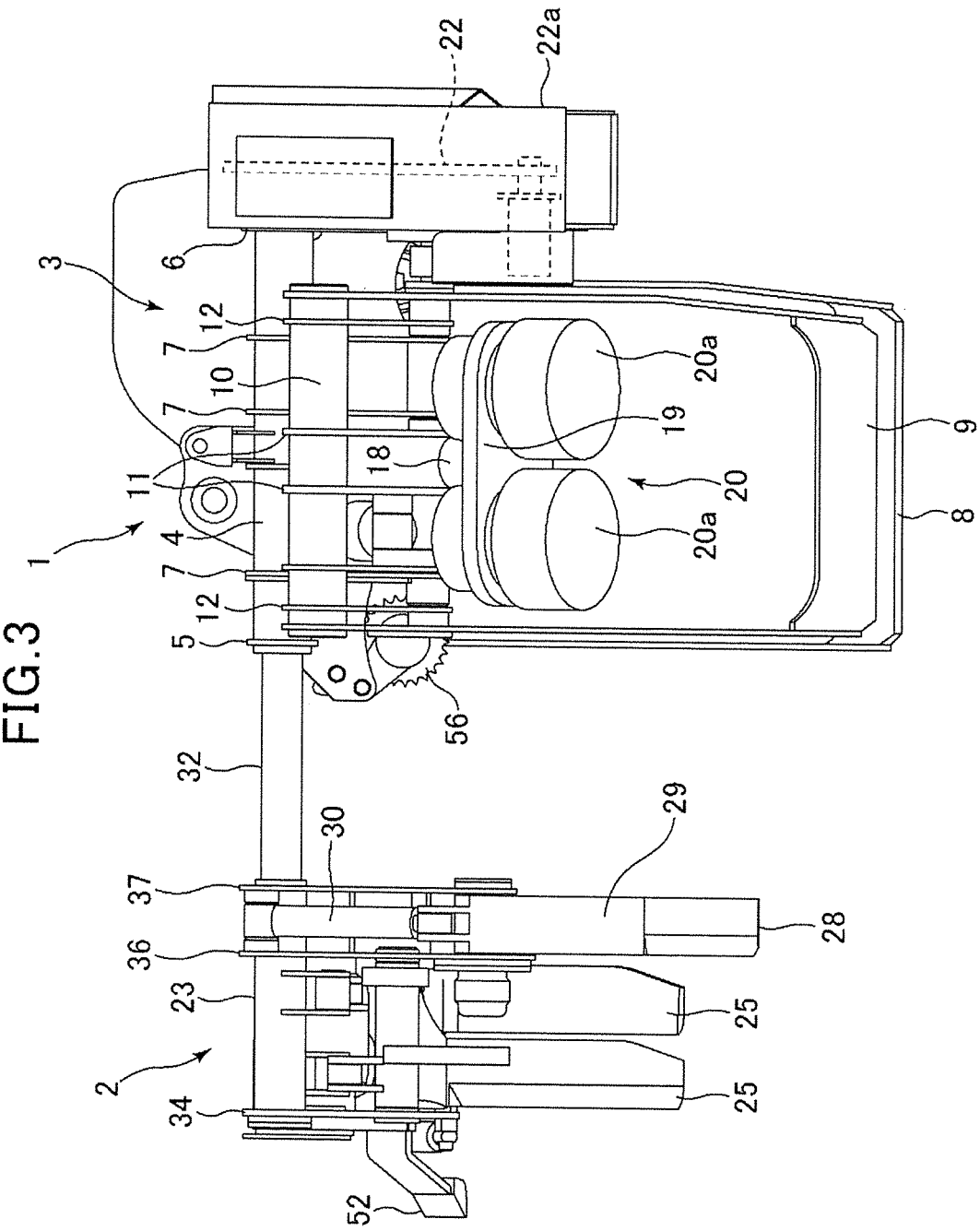
FIG. 3 a side view of an entire forestry harvester according to the invention, the delimbing unit being shown in a forward position advanced from the feed unit.
Figure 4:
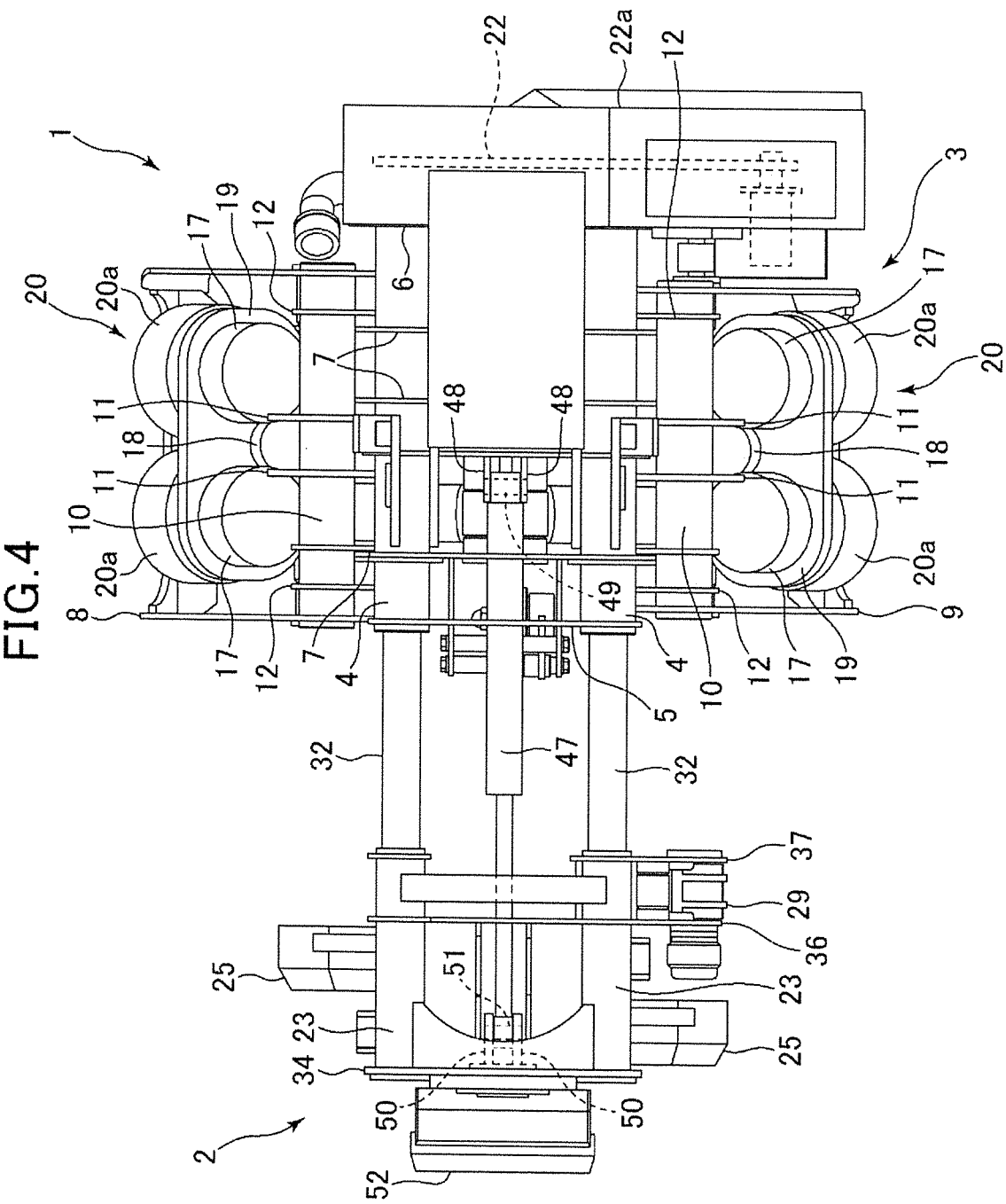
FIG. 4 a top plan view of the harvester shown in FIG. 3.
Figure 5:
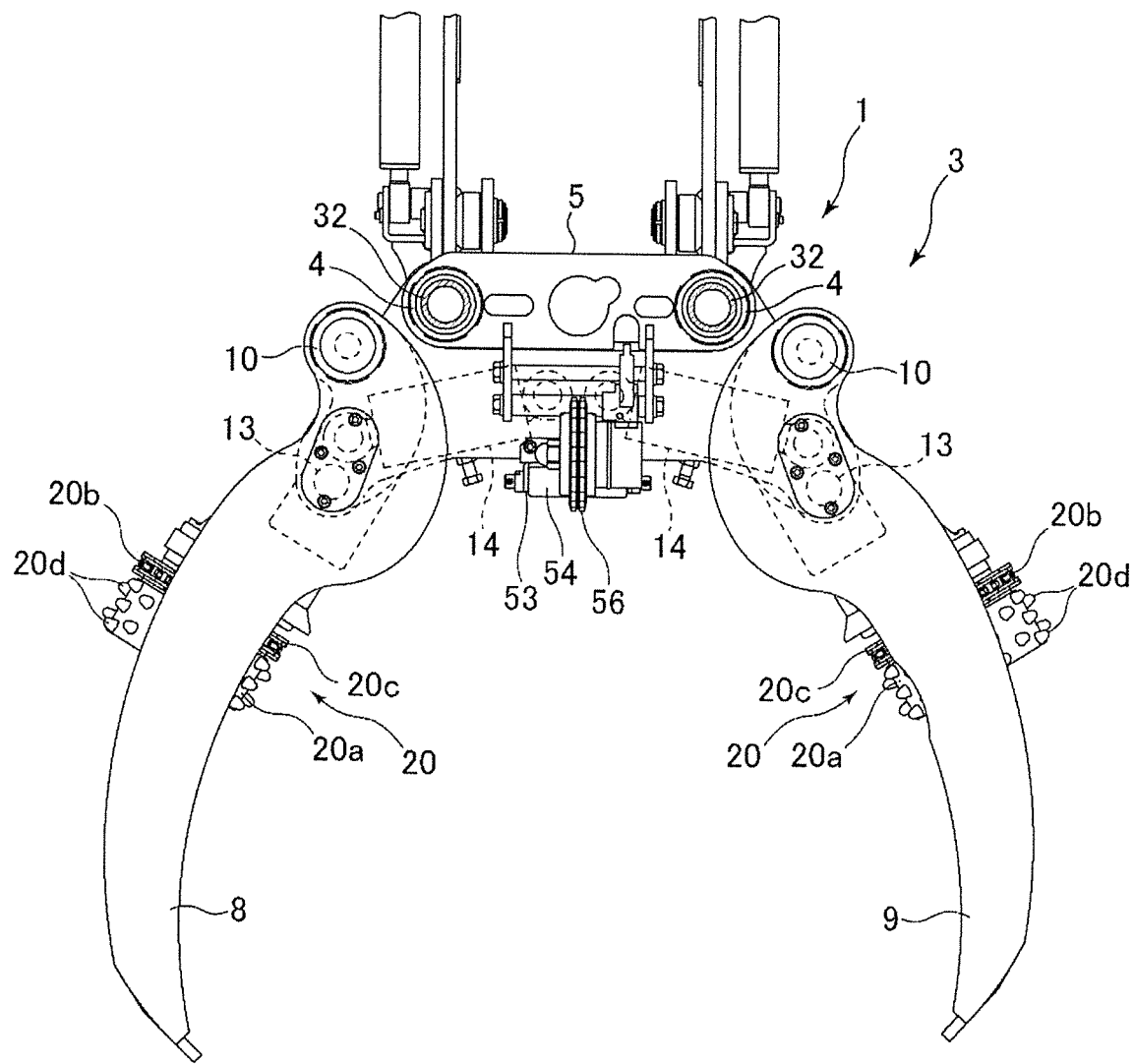
FIG. 5 a rear view of the feed unit.
Figure 6:
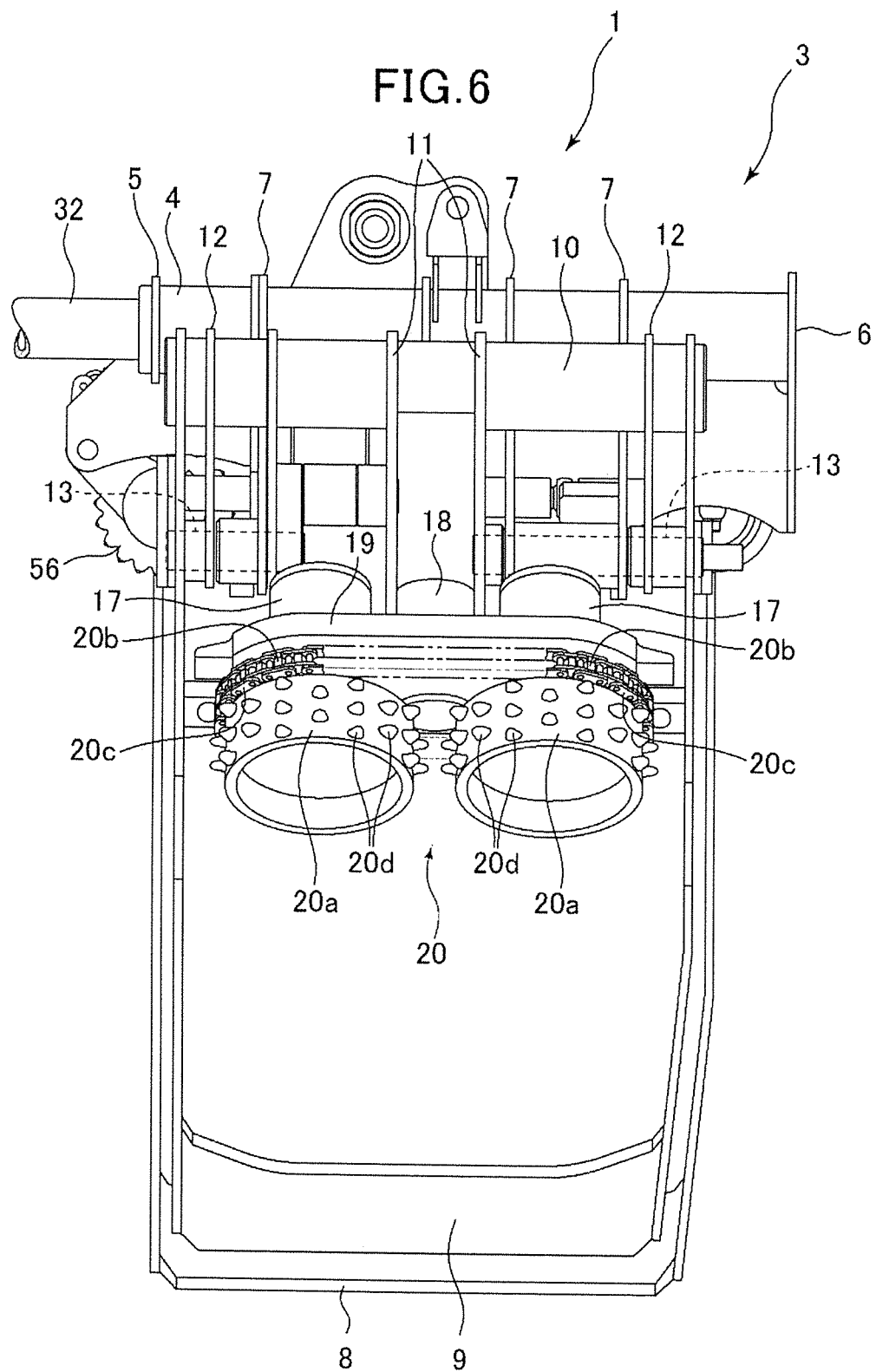
FIG. 6 a side view of the feed unit.
Figure 7:
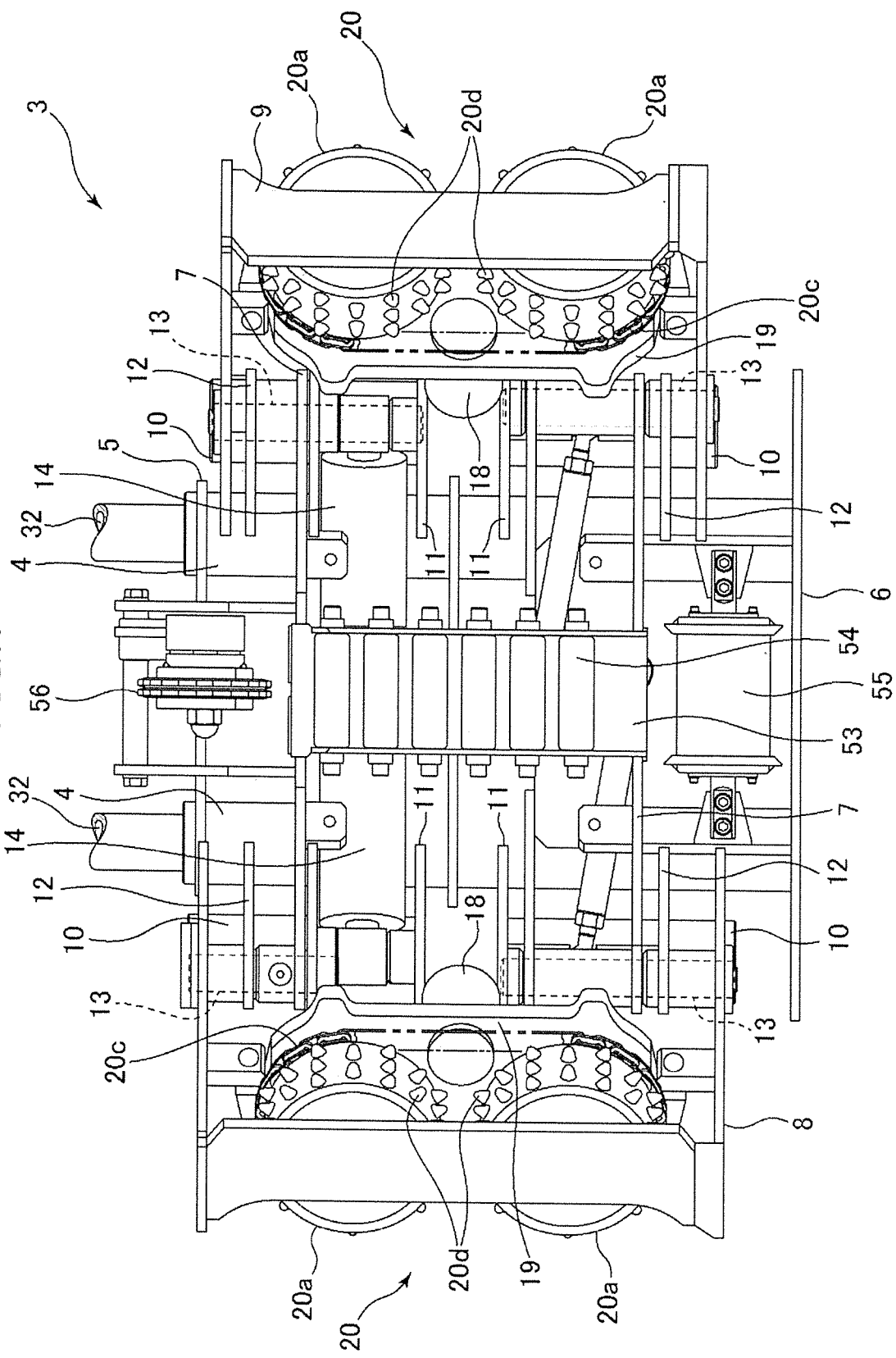
FIG. 7 a bottom plan view of the feed unit.

Referring to FIGS. 1 to 4, a forestry harvester according to the present invention comprises a feed unit 1 and a delimbing unit 2. FIGS. 1 and 2 show the delimbing unit 2 in its retracted position close to the feed unit 1. FIGS. 3 and 4 show the delimbing unit 2 in a position advanced from the feed unit 1. As can be seen in FIGS. 5 to 7, the feed unit 1 has a feed unit body 3 which includes a pair of longitudinally extending left-hand and right-hand guide pipes 4 and a front plate 5, a rear plate 6 and a plurality of mounting plates 7 fixed to the guide pipes for their interconnection. The harvester is provided with a pair of left-hand and right-hand clamp arms 8 and 9 pivotally connected to the harvester body and positioned in an offset relation relative to each other such that they are capable of intersecting. The clamp arms 8 and 9 are of a shape similar to each other and make the intersection possible when they are closed. Each of the clamp arms 8 and 9 has a connecting pipe 10 fixed to the upper end thereof and extending longitudinally similarly to the guide pipe 4. The connecting pipes 10 have a pair of central brackets 11 and front and rear brackets 12, 12 fixed to the connecting pipes. The pivotal connection of each clamp arm 8 and 9 to the feed unit 3 is effected by pivotally connecting to the feed unit body 3 by means of pivot pins 13, 13 provided between the brackets 12, 12 and one of the central brackets 11, 11 and the mounting bracket 17. Pivot pins 13, 13 are fixedly secured to the arm portions of the clamp arms so as to rotate together with the clamp arms.

Figure 8:
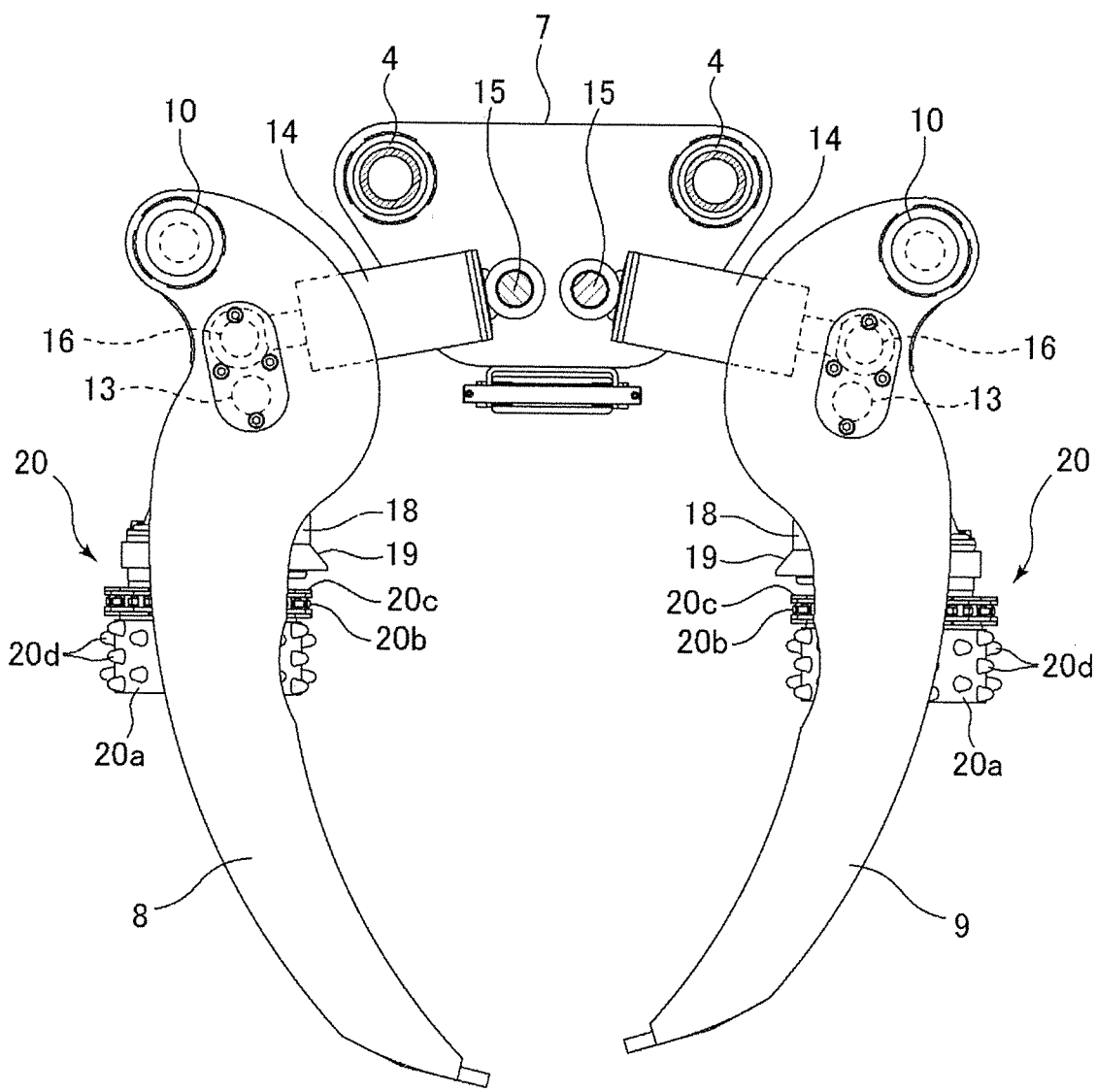
FIG. 8 a rear view of the clamp arms.

As can be seen in FIG. 8, each of a pair of hydraulic cylinders 14 is pivotally connected at its rear end to the mounting plate 7 by means of pin 15. Each hydraulic cylinder 14 is also pivotally connected at the plunger end to the other central bracket 11 and the bracket 12 by means of pin 16. Thus, the hydraulic cylinders are actuated to open and close the clamp arms 8 and 9 relative to each other around the pivot pins 13, 13 under the action of extension and retraction of the hydraulic cylinder 14. As can be seen in FIG. 9, each clamp arm includes a pair of reversible hydraulic motors 17, 17 mounted on a support plate 19 which is swingably carried on a fixed shaft 18 fixedly secured to between the central brackets 11, 11 in pair. Left-hand and right-hand feed means 20 each comprises a pair of feed rollers 20a, 20a fixedly secured to spindles of the hydraulic motors 17, 17 respectively, and adapted to be rotated in normal or positive or reverse directions by actuation of the hydraulic motors. The pair of feed rollers 20a, 20a is capable of accommodating to a change of the outside diameter of a timber by swing movement of the support plate 19 around the fixed shaft 18. Buffer springs 21, 21 are disposed between the support plate 19 and each clamp arm 8 and 9 to retain the support plate 19 in a balancing position (see FIG. 10).

The pair of feed rollers 20a, 20a are provided with spikes 20d on the circumferential surfaces thereof for preventing any slippage from the surface of the timber. In this embodiment, the feed means 20 each comprises a pair of spiked feed rollers, but may comprise a single spiked feed roller. As shown, the pair of feed rollers 20a, 20a is preferably synchronously rotated by a chain 20c entrained around sprockets 20b and 20b.

The feed unit body is provided on its rear side with a chain saw box 22a having a power chain saw 22.

Figure 11:
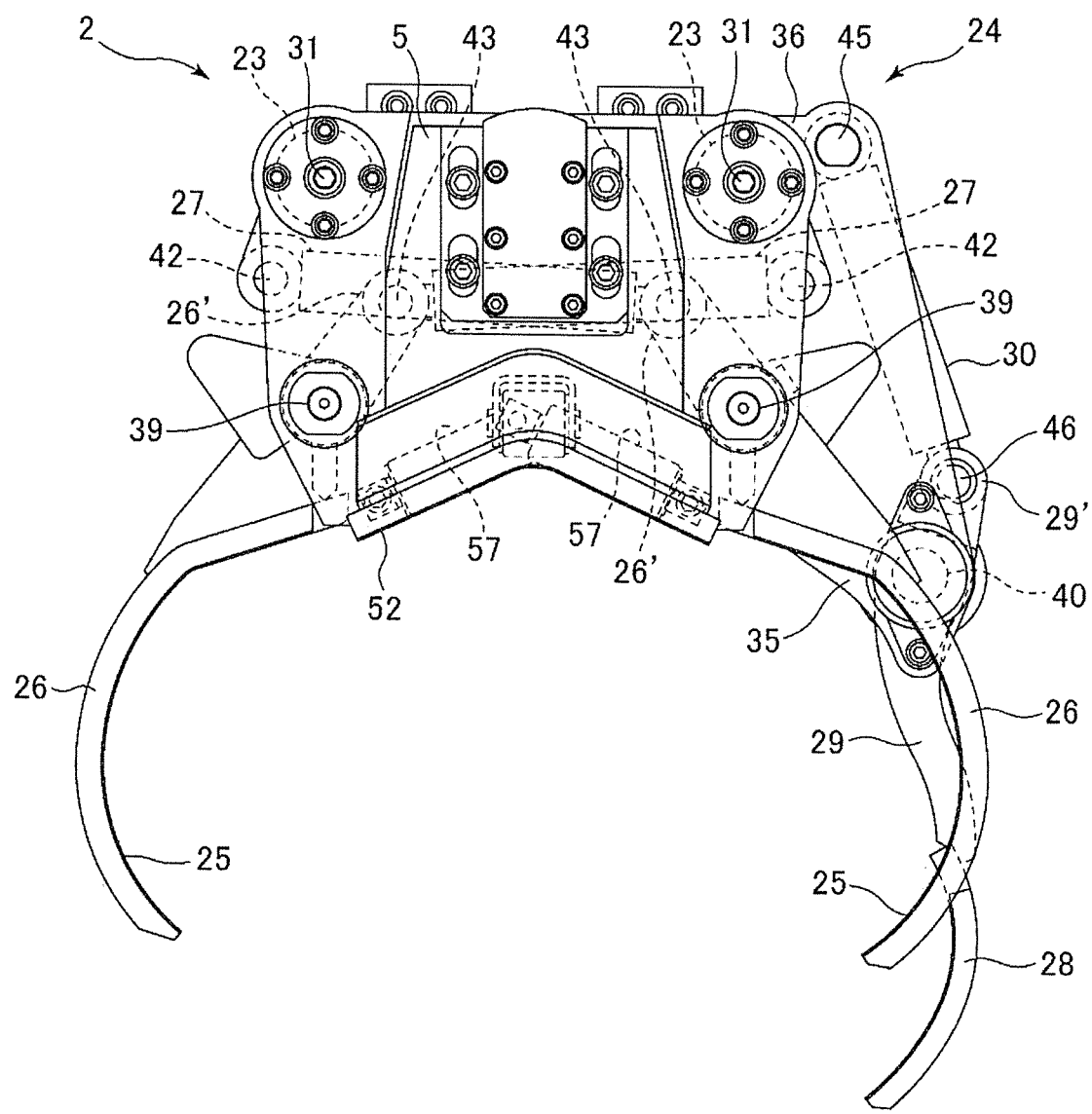
FIG. 11 a front view of the delimbing unit.
Figure 12:
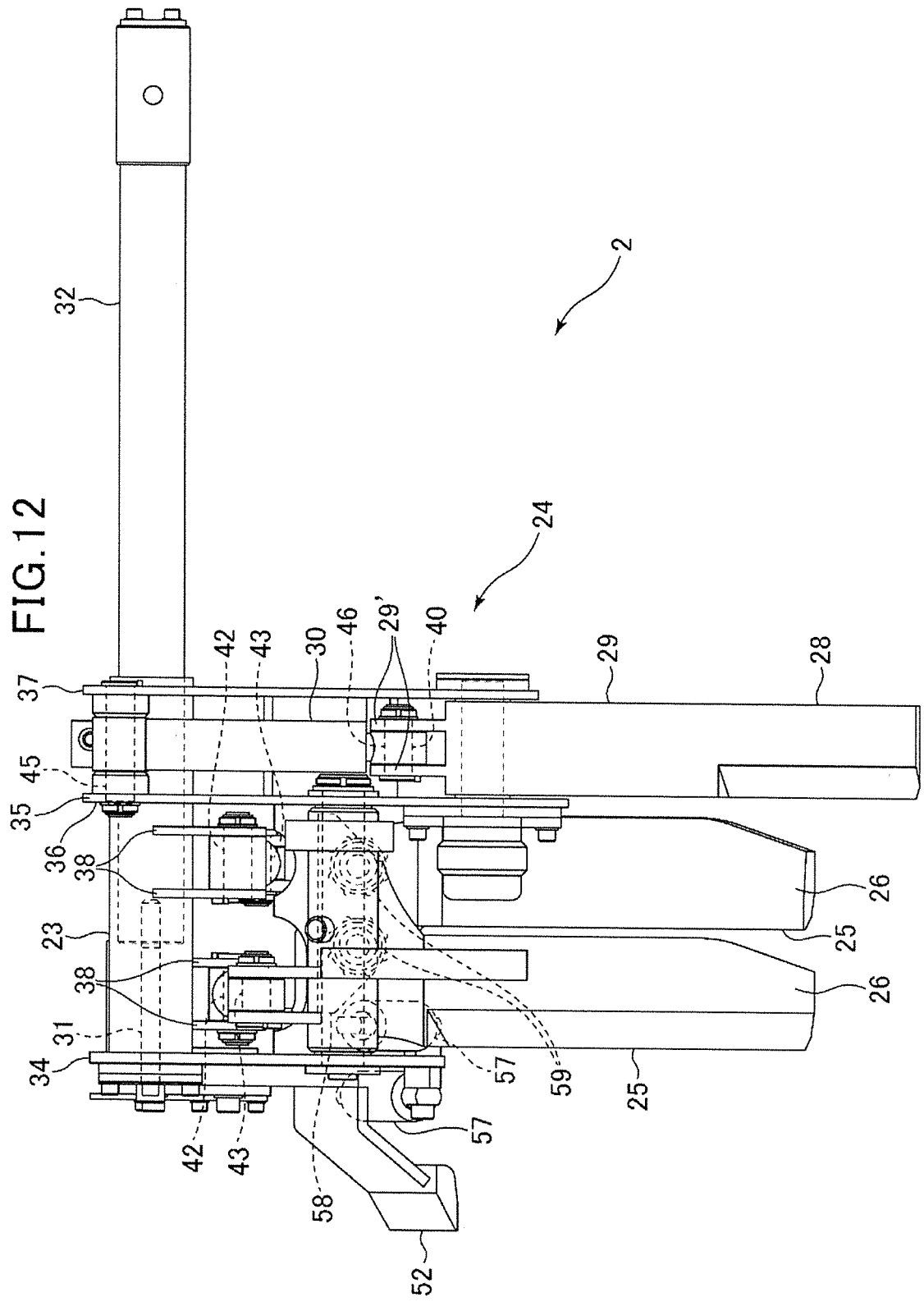
FIG. 12 a side view of the delimbing unit.
Figure 13:
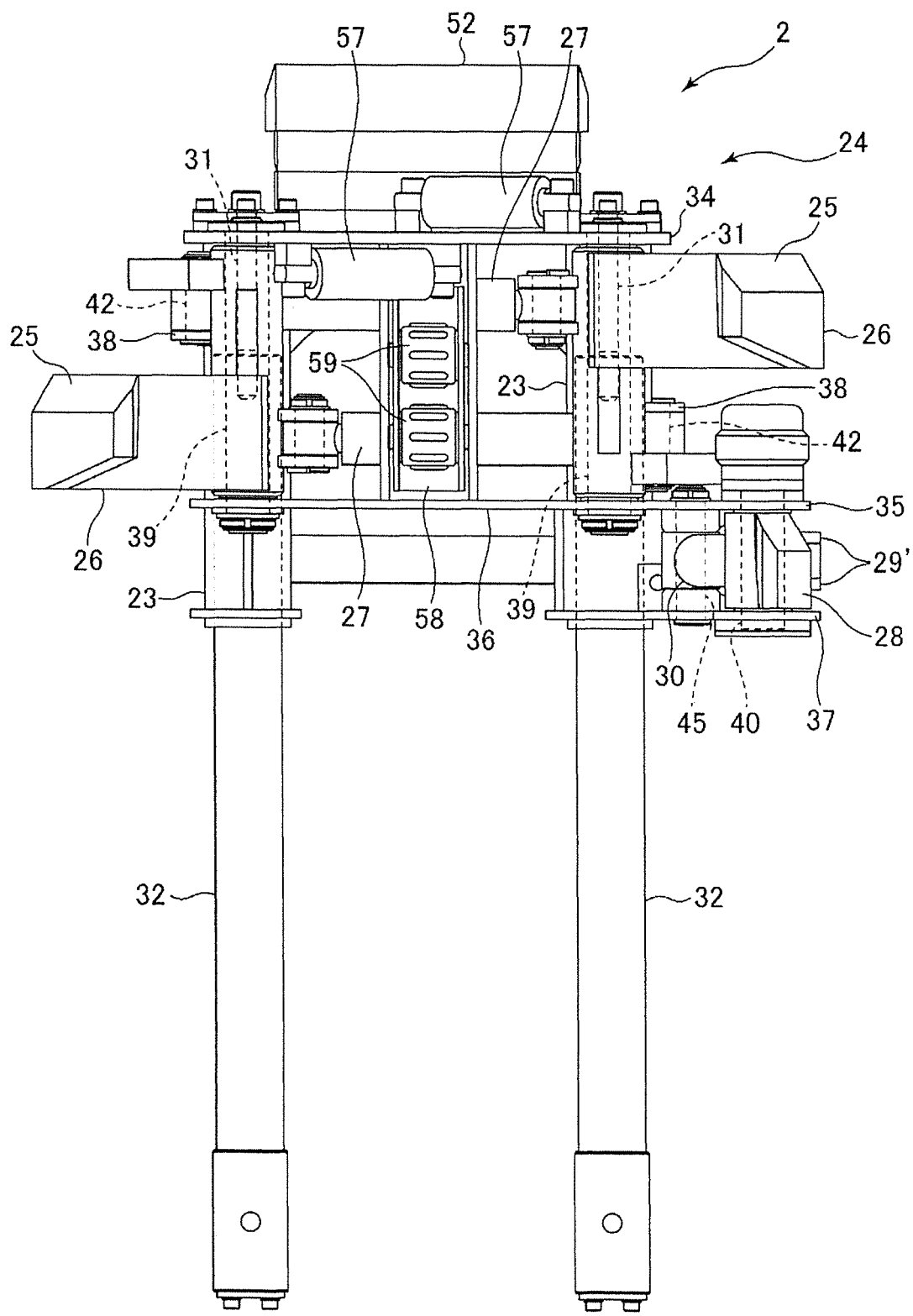
FIG. 13 a bottom plan view of the delimbing unit.

Referring to FIGS. 11-13, the delimbing unit 2 comprises a delimbing unit body 24 including a pair of left-hand and right-hand connecting pipes 23, 23, a pair of left-hand and right-hand cutter arms 26, 26 pivotally connected to the delimbing unit body 24 in front and middle positions shifted longitudinally from each other and having side cutters 25, and hydraulic cylinders 27, 27 actuated to open and close the cutter arms relative to each other. The delimbing unit 2 may further comprise a back cutter arm 29 pivotally connected to the delimbing unit body 24 and having a lower cutter 28, and a hydraulic cylinder 30 operated to open and close the cutter arm 29. The delimbing unit 2 includes slide shafts each fixed at its forward end to the connecting pipe 23 by means of a bolt 31 and extending forwardly from the interior of the connecting pipe so as to be inserted into the guide pipe 4 of the feed unit body 3. The slide shaft 32 and the guide pipe 4 are configured as a guide mechanism allowing the delimbing unit to move forward and rearward relative to the feed unit.

The delimbing unit 24 includes a front plate 34 and rear plate 36 each fixedly secured to the connecting pipes 23, 23, the rear plate 36 having a laterally protrusive bracket portion 35, a bracket 37 fixedly secured to one of the connecting pipes and configured as a counterpart to the bracket portion 35, and a pair of brackets 38, 38 fixedly secured to each of connecting pipes 23, 23 in a different position. The pivotal connection of the front and middle cutter arms 26, 26 relative to the delimbing unit body 24 is realized by connecting the cutter arms 26, 26 to front plate 34 and rear plate 36 by means of pivot pins 39, 39, and the pivotal connection of the rear cutter arm 29 relative to the delimbing unit body 24 is realized by connecting the cutter arm 29 to the bracket portion 35 and the bracket 37 by means of pivot pin 40. The hydraulic cylinders 27, 27 for opening and closing the front and middle cutter arms 26, 26 are connected at their rear ends to the brackets 38, 38 by means of pins 42 and at the plunger ends to the upper ends 26' of the front and middle cutter arms 26, 26 by means of pins 43. The hydraulic cylinders 30 for opening and closing the rear cutter arm 29 is connected at its rear end to the rear plate 36 and the bracket 37 by means of pin 45 and at its plunger end to the upper end 29' of the rear cutter arm 29 by means of pin 46.

A hydraulic cylinder 47 is positioned on a longitudinal center line of the feed unit 1 and delimbing unit 2 and connected to them. Particularly, the hydraulic cylinder 47 is connected at its rear end to brackets 48 on the mounting plate 7 of the feed unit body 3 by means of a pin 49 and at the plunger end to brackets 50 of the front plate 34 of the delimbing unit body 24 by means of pin 51. The hydraulic cylinder 47 is operated to move the delimbing unit 2 toward and away from the feed unit body 3 under the action of extension and retraction thereof. There is provided an angle-shaped upper cutter 52 which is positioned in front of the front plate 34 and supported by the front plate 34.

The feed unit 1 preferably has a number of small diameter rollers 54 mounted horizontally on support frame 53 fixedly secured to the feed unit 3 on the longitudinal center line thereof and a large diameter roller 55 provided in a rearward position of the feed unit body 3. Those rollers 54 and 55 are provided for the purpose of receiving and guiding the timber and function to ensure smooth movement of the timber. Feed unit 1 is also provided with encoder measuring instrument 56 as well known in this kind of harvesters for measuring the length of the timber to be fed forward by rotation of the feed rollers.

The delimbing unit 2 preferably has a pair of rollers 57, 57 located behind the angle-shaped upper cutter 52 and in longitudinally different positions and the rollers being arranged obliquely relative to each other when viewed from the front, and a plurality of rollers 59 mounted horizontally on a support frame 58 fixedly secured to delimbing unit body 24 on the longitudinal center line of the delimbing unit 2. The obliquely arranged rollers 57, 57 are provided for the purpose of receiving and guiding the timber and function to ensure smooth movement of the timber.

Figure 14:
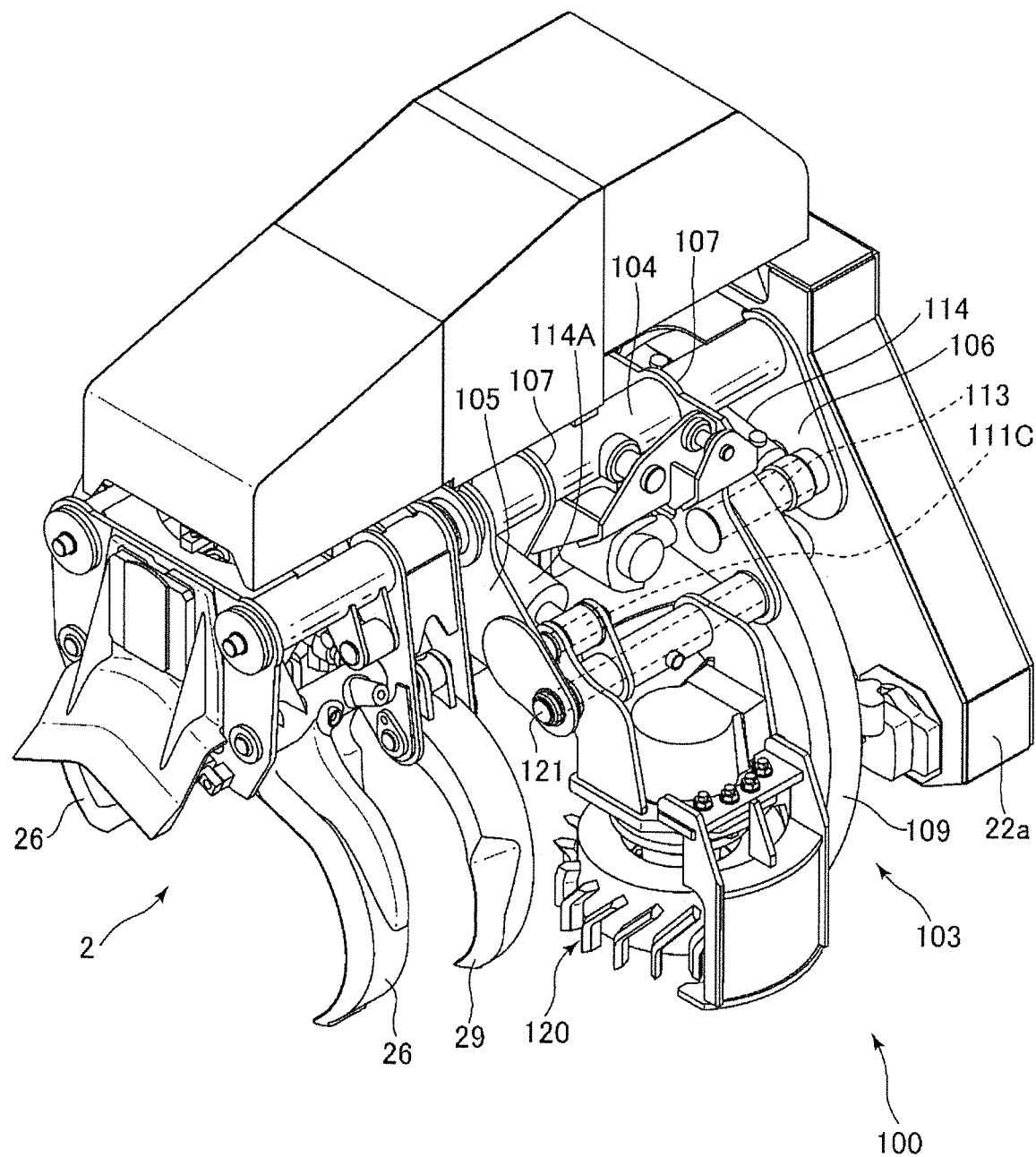
FIG. 14 a perspective view of a forestry harvester of a second embodiment of the invention as viewed from the right front.
Figure 15:
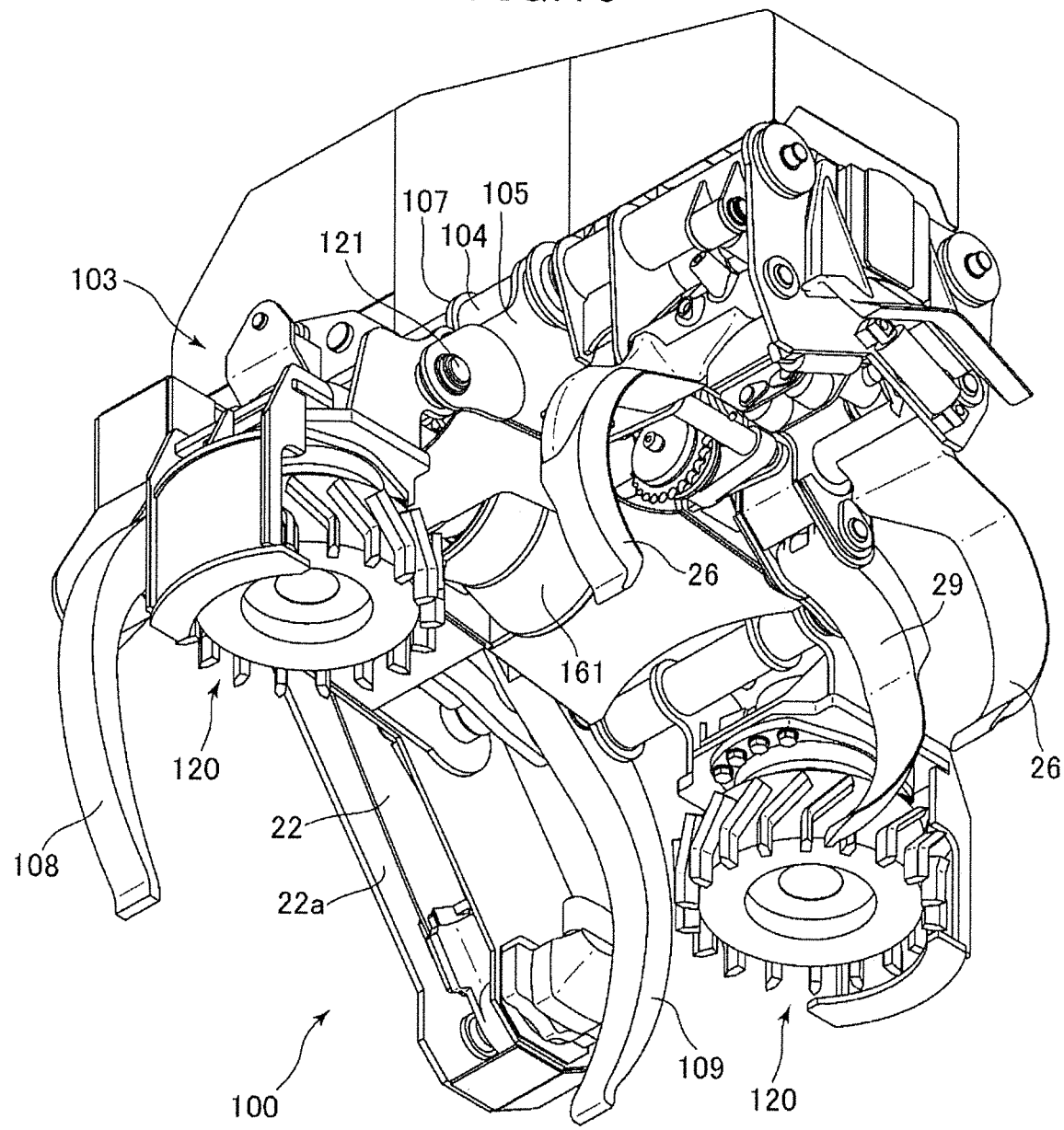
FIG. 15 a perspective view of the harvester shown in FIG. 14 as viewed from the bottom.
Figure 16:
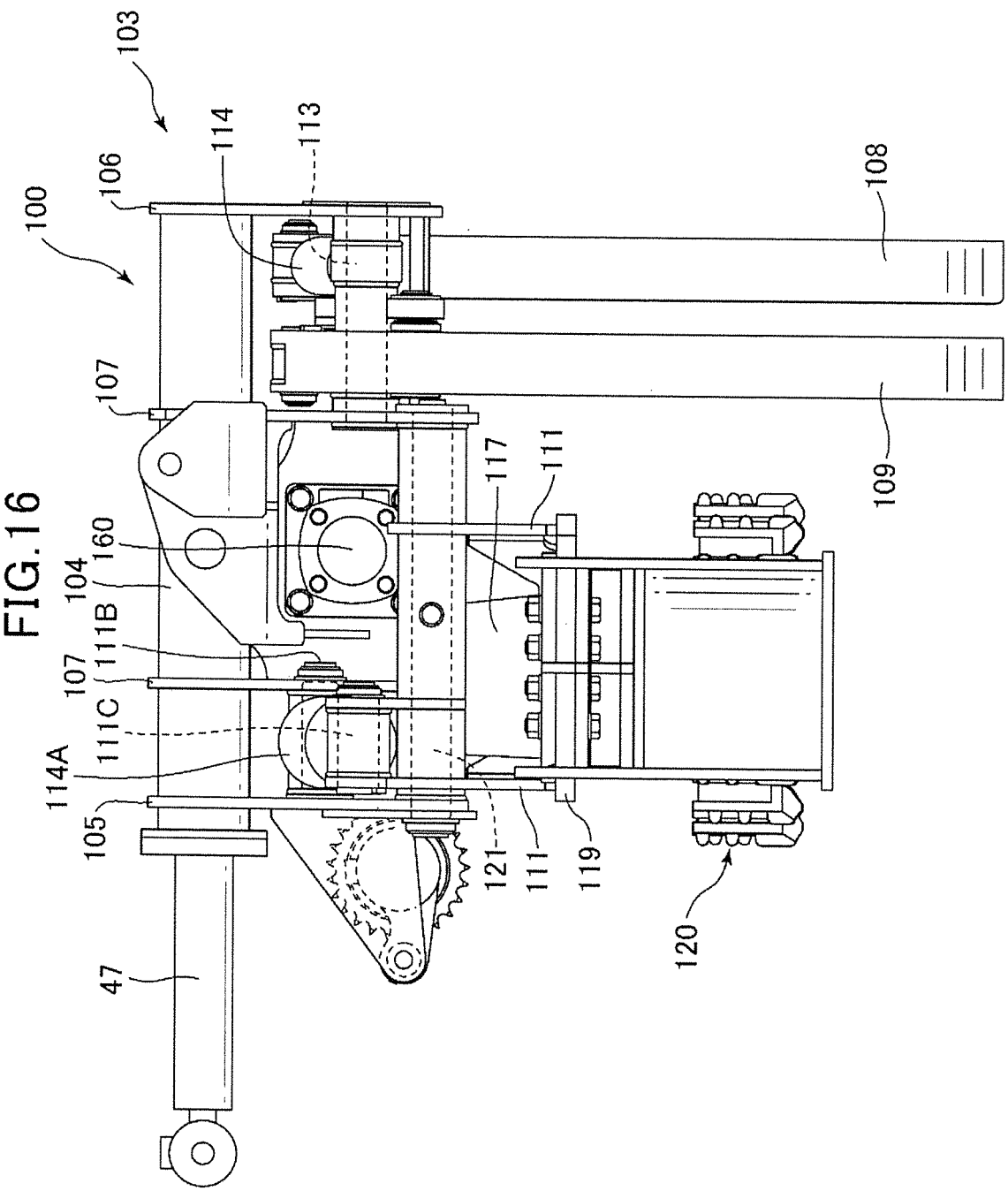
FIG. 16 a side view of the feed unit of the harvester.
Figure 17:
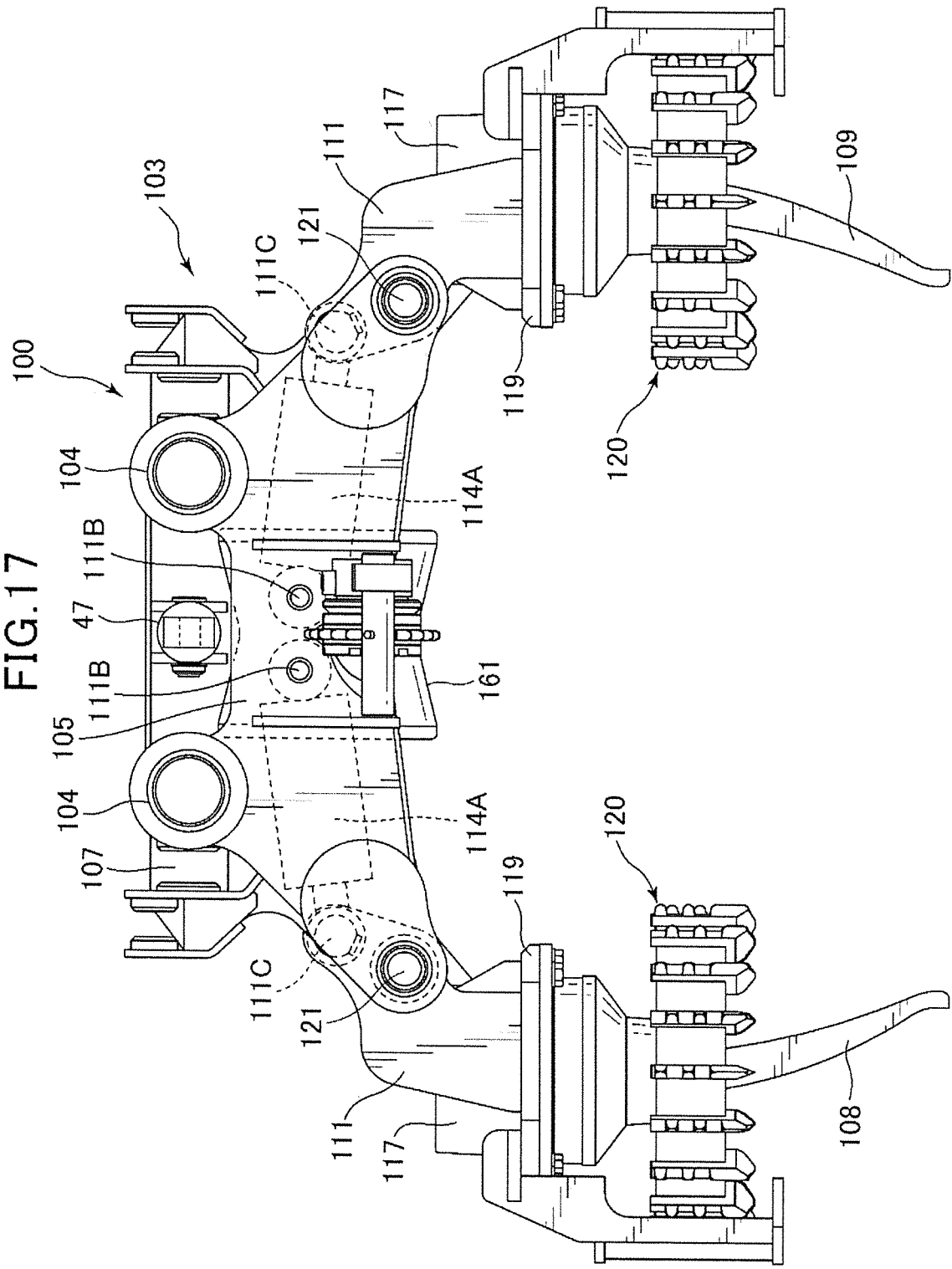
FIG. 17 a front view of the feed unit shown in FIG. 16.
Figure 18:
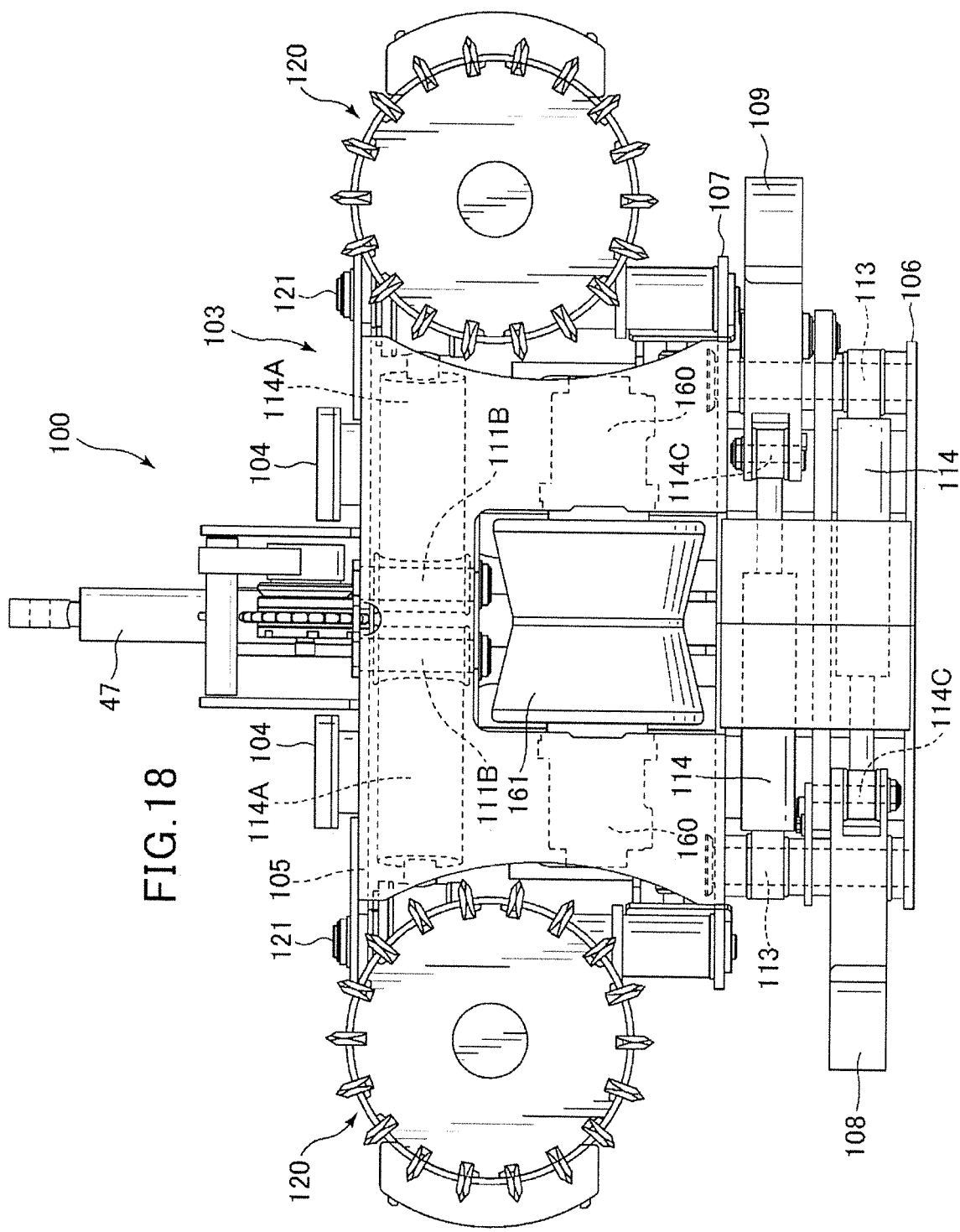
FIG. 18 a bottom view of the feed unit shown in FIG. 16.
Figure 19:
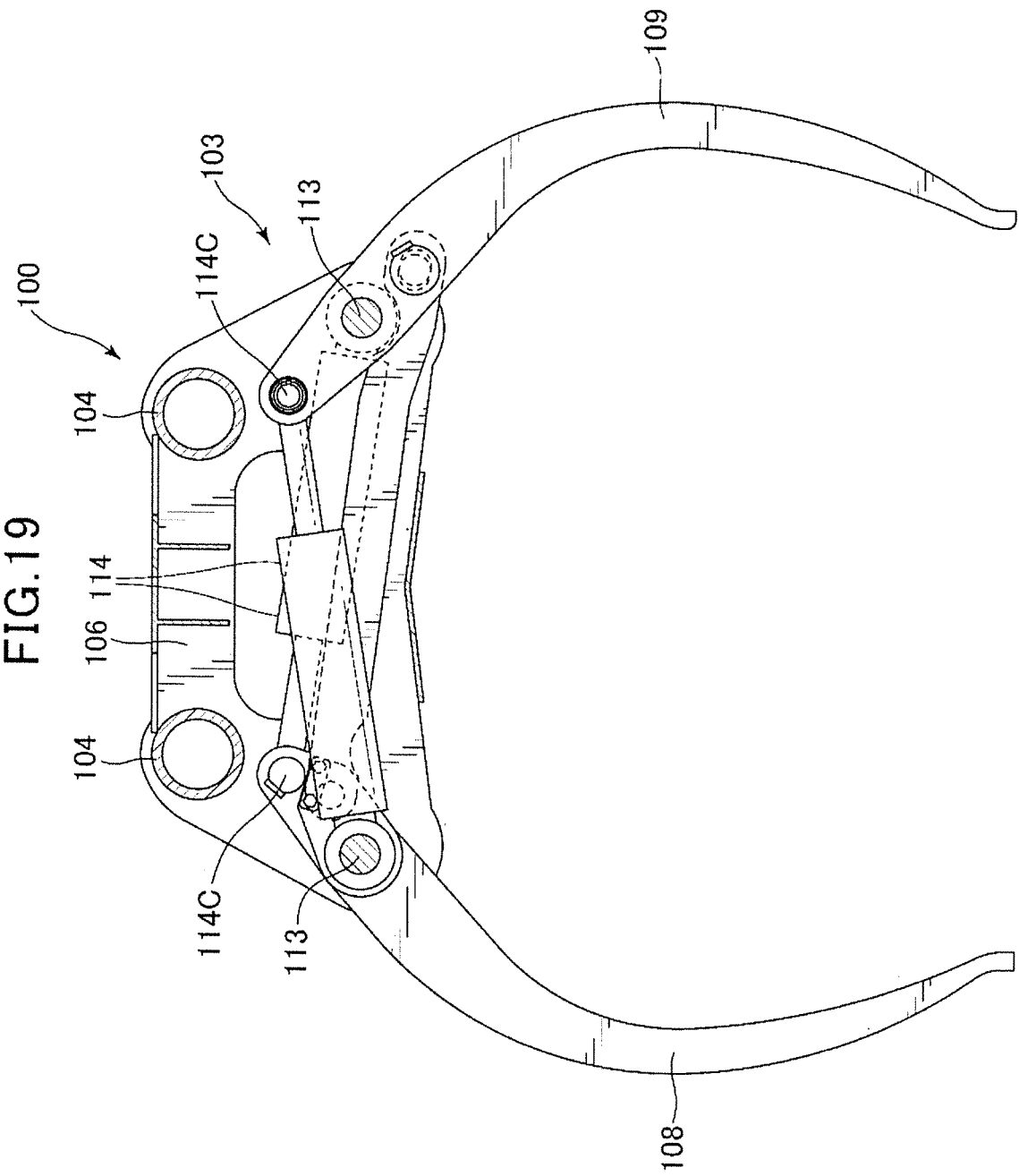
FIG. 19 a front view of the clamp arms of the feed unit.

FIGS. 14 and 15 show a forestry harvester according to a second embodiment of the invention. FIGS. 16 to 19 show a feed unit 100 of the harvester and the harvester includes a delimbing unit 2 which is substantially same as that shown in FIGS. 1 to 4 and FIGS. 11 to 13. Accordingly, only the feed unit will be described below.

Feed unit 100 includes a feed unit body 103 including a pair of longitudinally extending left-hand and right-hand guide pipes 104, a front plate 5, a rear plate 6 and a plurality of mounting plates 7 each fixed to the guide pipes 104 for interconnection of the guide pipes. The harvester is provided with a pair of left-hand and right-hand clamp arms 108 and 109 pivotally connected to the harvester body and positioned in an offset relation relative to each other such that they are capable of intersecting. Pivotal connection of each of the clamp arms 108 and 109 relative to the feed unit body 103 is effected by pivotally connecting each clamp arm 108 and 109 to feed unit body 103 by means of each of pivot pins 113, 113 provided between the rear plate 106 and the mounting plate 107.

A pair of hydraulic cylinders 114 are pivotally connected at their rear ends to pivot pins 113 and 103 for the clamp arms 108 and 109 and at their plunger ends to the top ends of the clamp arms 108 and 109. The hydraulic cylinders 114 are operated to open and close the clamp arms 108 and 109 relative to each other about the pivot pins 113, 113 under the action of extension and retraction of hydraulic cylinders.

Reversible hydraulic motor means comprise hydraulic motors 117, 117 each mounted on a support plate 119 secured to brackets 111, 111 which are pivotally connected to between the front plate 105 and the mounting plate 107 by means of a pivot pin 121. Feed rollers 120 are each fixedly secured to the spindle of the hydraulic motor 117. Hydraulic cylinders 114A are each pivotally connected at its rear end to the front plate 105 and the mounting plate 107 by means of a pivot pin 111B and at its plunger end to the top end of the bracket 111 by means of a pivot pin 111C. Thus, the hydraulic cylinders 114A are operated to open and close the feed rollers 120, 120 relative to each other under the action of expansion and constriction of the hydraulic cylinders.

Even in the second embodiments, the feed unit body is provided on its rear side with the chain saw box 22a having the power chain saw 22.

In the second embodiment of the invention, the feed unit body 100 includes a hourglass roller 161 rotatively driven by a pair of hydraulic motors 160, 160 mounted on the feed unit body 103 on the longitudinal center line, an hourglass roller being provided to facilitate feeding of the timber.

According to the invention, the delimbing unit 2 of the harvester is normally retracted by the action of retraction of the hydraulic cylinder 47 to position close to the feed units 1 and 100. In this state, the entire harvester is vertically oriented and a standing tree is secured with the clamp arms 8 and 9 and feed rollers 20a, 20a closed about the pivot pins 13, 13 by the action of extension of the hydraulic cylinders 14, 14, and with the cutter arms 26, 26, and 29 closed about the pivot pins 39, 39, and 40 by the action of extension of the hydraulic cylinders 27, 27, and 30. The power chain saw 22 is then actuated to cut the standing tree at a part near the roots thereof.

In the second embodiment of the invention, the secured of the standing tree is carried out with clamp arms 108 and 109 closed about the pivot pins by the action of extension of the hydraulic cylinders 114, 114 and with the feed rollers 120, 120 closed about the pivot pins 121, 121 by the action of extension of the hydraulic cylinders 114A, 114A.

Subsequently to the cutting of the standing tree, a boom and or arm is operated to fell the tree along with the harvester. The hydraulic motors 17, 17 or 117, 117 are actuated to rotate the feed rollers 20a, 20a or feed rollers 120, 120 thereby feeding forward the timber a predetermined length. The timber is smoothly fed with the rollers 54 and 55 or hourglass roller 161 provided on the feed unit body or the rollers 57 and 59 provided on the delimbing unit body. During the forward feeding of the timber, the fixed angle-shaped upper cutter 52, side cutters 25, 25 and lower cutter 28 of the front, middle and rear cutter arms 26, 26, and 29 delimb the timber without exception.

At the time when the limbs are not cut off, the rotation of the hydraulic motors stops due to an overload imposed thereon, and therefore the feeding of the timber by the feed rollers 20a, 20a or 120, 120 is stopped. By positioning the clamp arms 8 and 9 or 108 and 109 against the timber by the hydraulic cylinders, the feed unit becomes stationary relative to the timber. The extension of the hydraulic cylinder then causes the delimbing unit 2 to advance from the feed unit, in a direction where the delimbing unit is moved away from the feed unit, with the slide shafts 32 guided by the guide pipes 4 of the feed unit body 3 thereby cutting off the limbs with the cutters 25. 25. And 28 of the advancing delimbing unit. The retraction of the hydraulic cylinder 47 then causes the delimbing unit 2 to retract to the position adjacent the feed unit 1 or 100, and the clamps are then released. Rotation of the feed rollers 20a, 20a, or 120, 120 by the hydraulic motors causes the timber to move forward a predetermined length. When the timber arrives at the predetermined length, the rotation of the feed rollers is stopped and the chain saw is actuated to cut the timber into a log. Since the clamp arms 8 and 9 are long enough in length to function as grapples, they can correctly grapple and carry a plurality of logs which collect in front of the chain saw box.

With the harvester according to the invention, after cut and sideways felled timber is picked up, the feeding of the timber a predetermined length and cutting of the timber by the chain saw may be done in the same manner as the above-mentioned to obtain logs having a predetermined length.

DESCRIPTION OF THE REFERENCE NUMBERS 1 feed unit
2 delimbing unit
3 feed unit body
4 guide pipes
8 clamp arms
9 clamp arms
10 support pipes
14 hydraulic cylinders
17 hydraulic motors
20 feed rollers (feed means)
22 power chain saw
22a chain saw box
23 connecting pipes
24 delimbing unit body
25 side cutters
26 cutter arms
27 hydraulic cylinders
28 lower cutter
29 rear cutter arm
30 hydraulic cylinders
52 angle-shaped upper cutter
53 support frame
54 small diameter rollers
55 large diameter roller
57 rollers
58 support frame
59 rollers
100 feed unit
103 feed unit body
104 guide pipes 108 clamp arm
109 clamp arm
114 hydraulic cylinders
117 hydraulic motors
120 feed rollers (feed means)
22 power chain saw
22a chain saw box

The invention claimed is:

1. A forestry harvester comprising:
a feed unit including a feed unit body, and feed means rotatably driven by reversible hydraulic motors to advance the tree;
a chain saw box mounted on the feed unit body and including a power chain saw;
a delimbing unit including a delimbing unit body, an angular upper cutter fixedly secured to the delimbing unit body and a pair of cutter arms pivotally connected to the delimbing unit body in a longitudinally offset positions and each having a side cutter, and hydraulic cylinders actuated to open and close the cutter arms relative to each other; guide mechanism for guiding the delimbing unit for its forward and reverse movement relative to the feed unit; and
a hydraulic cylinder connected to the delimbing unit and the feed unit and actuated to move the delimbing unit toward and away from the feed unit under an action of extension and retraction thereof;
wherein the feed unit body of the feed unit further includes a pair of a single left-hand clamp arm and a single right-hand clamp arm, both pivotally connected to the feed unit body, and hydraulic cylinders actuated to open and close the clamp arms relative to each other, and the feed means is mounted on each of the clamp arms; and
wherein when an actuation of the hydraulic motor stops due to an overload imposed thereon so that the timber cannot be fed by the feed means, the feed unit becomes stationary relative to the timber by positioning the clamp arms of the feed unit against the timber by the hydraulic cylinders, and the hydraulic cylinder is extended to advance the delimbing unit from the feed unit, thereby cutting off the limbs with the upper cutter and the side cutter of the advanced delimbing unit.

2. The forestry harvester of claim 1, wherein the delimbing unit includes a rear cutter arm having a lower cutter and a hydraulic cylinder actuated to open and close the cutter arm.

3. The forestry harvester of claim 1, wherein the feed means comprises a single roller having spikes on the periphery thereof or plurality of rollers each having spikes on the periphery thereof to prevent the roller or rollers from slipping from the surface of the tree.

4. The forestry harvester of claim 1, wherein the feed means comprises a pair of feed rollers, each of clamp arms includes a connecting pipe fixedly secured to the upper ends of the clamp arm and extending longitudinally, a pair of central brackets fixed to the connecting pipe, a reversible hydraulic motor means comprises a pair of hydraulic motors installed on a mounting plate swingingly mounted on a fixed shaft secured to between the central brackets, each of the feed rollers is fixedly secured to a spindle of the hydraulic motor, and there are provided buffer springs between the mounting plate and the clamp arm.

5. The forestry harvester of claim 1, wherein the feed unit body includes a pair of left-hand and right-hand longitudinally extending guide pipes, the delimbing unit includes a pair of left-hand and right-hand longitudinally extending connecting pipes, and the guide mechanism comprises the guide pipes on the feed unit body and a slide shaft extending rearwardly from the connecting pipes on the delimbing unit and inserted into the guide pipes.

6. The forestry harvester of claim 1, wherein the feed unit includes a number of horizontally juxtaposed small diameter rollers mounted on a support frame fixedly secured to the feed unit body on a longitudinal center of the feed unit and a large diameter roller mounted on the feed unit body in its forward position.

7. The forestry harvester of claim 1, wherein the delimb unit includes a pair of rollers disposed in an angular form as viewed from the front, behind the angular upper cutter, and mounted rotatively on the delimbing unit body, the rollers being longitudinally shifted from each other, and a plurality of horizontally juxtaposed rollers mounted on a support frame fixedly secured to the delimbing unit body on its longitudinal center.

8. A forestry harvester comprising:
a feed unit including a feed unit body, and a pair of a single left-hand feed means and a single right-hand feed means pivotally connected to the feed unit body and rotatably driven by reversible hydraulic motors to advance the tree;
a chain saw box mounted on the feed unit body and including a power chain saw;
a delimbing unit including a delimbing unit body, an angle-shaped upper cutter fixedly secured to the delimbing unit body and a pair of cutter arms pivotally connected to the delimbing unit body in longitudinally offset positions and each having a side cutter, and hydraulic cylinders actuate to open and close the cutter arms relative to each other;
a guide mechanism for guiding the delimbing unit for its forward and reverse movement relative to the feed unit; and
a hydraulic cylinder connected to the delimbing unit and the feed unit and actuated to move the delimbing unit toward and away from the feed unit under an action of extension and retraction thereof;
wherein the feed unit body of the feed unit further includes a pair of a single left-hand clamp arm and a single right-hand clamp arm, both pivotally connected to the feed unit body, and hydraulic cylinders actuated to open and close the clamp arms relative to each other, and
wherein when an actuation of the hydraulic motor stops due to an overload imposed thereon so that the timber cannot be fed by the feed means, the feed unit becomes stationary relative to the timber by positioning the clamp arms of the feed unit against the timber by the hydraulic cylinders, and the hydraulic cylinder is extended to advance the delimbing unit from the feed unit, thereby cutting off the limbs with the upper cutter and the side cutter of the advanced delimbing unit.

9. The forestry harvester of claim 8, wherein the delimbing unit further includes a rear cutter arm having a lower cutter and a hydraulic cylinder actuated to open and close the cutter arm.

10. The forestry harvester of claim 8, wherein the feed means comprises a left-hand single feed roller and a right-hand single feed roller, each having spikes on the periphery thereof to prevent the roller from slipping from the surface of the tree.

11. The forestry harvester of claim 8, wherein the reversible hydraulic motor means each comprises a hydraulic motor installed on a support plate secured to brackets rotatively supported from the feed unit body, and each of the left-hand and right-hand rollers is fixedly secured to a spindle of the hydraulic motor.

12. The forestry harvester of claim 1, wherein the feed unit body includes a pair of left-hand and right-hand longitudinally extending guide pipes, the delimbing unit includes a pair of left-hand and right-hand longitudinally extending connecting pipes, and the guide mechanism comprises the guide pipes on the feed unit body and a slide shaft extending rearwardly from the connecting pipes on the delimbing unit and inserted into the guide pipes on the feed unit body.

13. The forestry harvester of claim 8, wherein the feed unit includes hourglass-shaped rollers rotatively driven by a pair of left-hand and right-hand hydraulic motors to assist the rollers in feeding the tree.

14. The forestry harvester of claim 8, wherein the delimbing unit includes a pair of rollers disposed in an angular form as viewed from the front, behind the angular upper cutter, and rotatively mounted on the delimbing unit body, the rollers being longitudinally shifted from each other, and a plurality of horizontally juxtaposed rollers mounted on a support frame fixedly secured to the delimbing unit body on its longitudinal center.

15. A method of operating a forestry harvester comprising:
 a feed unit including a feed unit body, and feed means rotatively driven by reversible hydraulic motors means to advance the tree,
 a chain saw box mounted on the feed unit body and including a power chain saw,
 a delimbing unit including a delimbing unit body, an angular upper cutter fixedly secured to the delimbing unit body and a pair of cutter arms pivotally connected to the delimbing unit body in longitudinally offset positions and each having a side cutter, hydraulic cylinders actuated to open and close the cutter arms relative to each other, the angular upper cutter and the side cutter cutting off limbs substantially without stripping an outer skin of the tree;
 a guide mechanism for guiding the delimbing unit for its forward and reverse movement relative to the feed unit; and
 a hydraulic cylinder connected to the delimbing unit and the feed unit and actuated to move the delimbing unit toward and away from the feed unit; and
 the forestry harvester further including a pair of a single left-hand clamp arm and a single right-hand clamp arm, both pivotally connected to the feed unit body and positioned in an offset relation relative to each other such that they are capable of intersecting, and hydraulic cylinders actuated to open and close the clamp arms relative to each other,
the method comprising the steps of
stopping an actuation of the hydraulic motor means due to an overload imposed thereon so that the timber cannot be fed by the feed means;
positioning the clamp arms of the feed unit against the timber by the hydraulic cylinders so that the feed unit becomes stationary relative to the timber; and
extending the hydraulic cylinder to advance the delimbing unit from the feed unit, thereby cutting off the limbs with the upper cutter and the side cutter of the advanced delimbing unit.

\* \* \* \* \*